Dec. 15, 1959     L. H. PAULSOHN     2,916,964
DEVICE FOR FEEDING DISCS IN PROJECTORS, VIEWERS, AND THE LIKE
Filed March 31, 1958     3 Sheets-Sheet 1

INVENTOR.
LESTER H. PAULSOHN
BY
BUCKHORN, CHEATHAM & BLORE
ATTORNEYS

Dec. 15, 1959     L. H. PAULSOHN     2,916,964
DEVICE FOR FEEDING DISCS IN PROJECTORS, VIEWERS, AND THE LIKE
Filed March 31, 1958     3 Sheets-Sheet 2
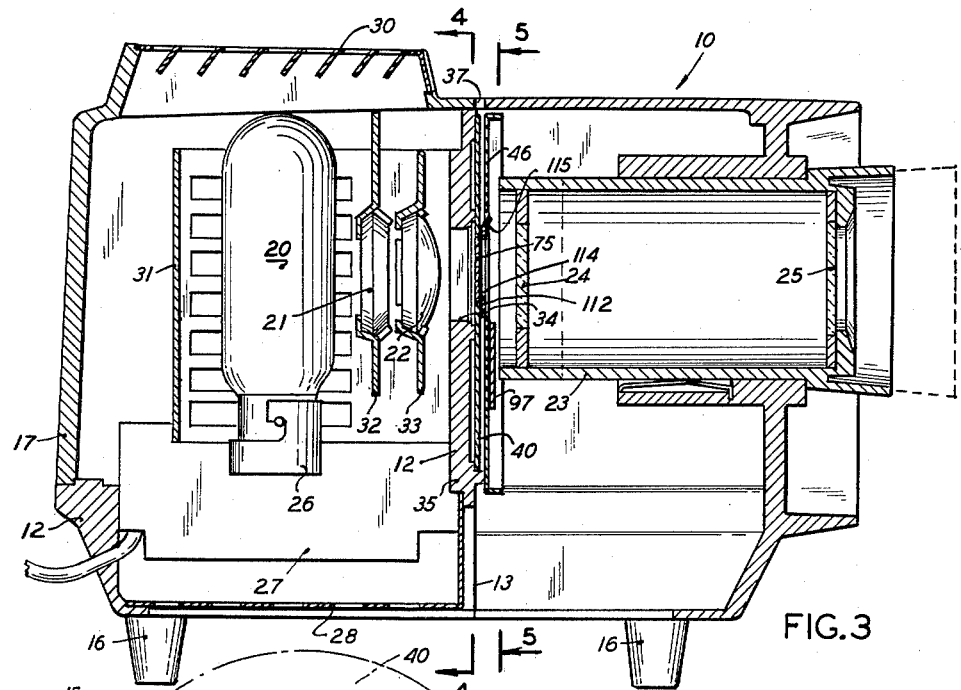
FIG. 3
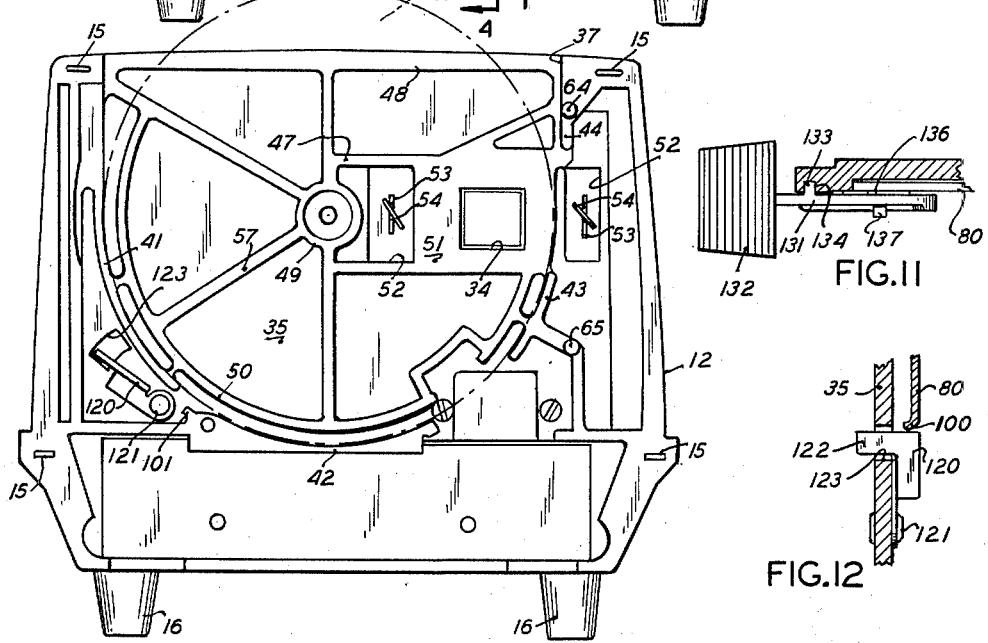
FIG. 4
FIG. 11
FIG. 12
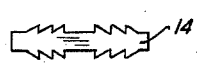
FIG. 13
INVENTOR.
LESTER H. PAULSOHN
BY
BUCKHORN, CHEATHAM & BLORE
ATTORNEYS Dec. 15, 1959  L. H. PAULSOHN  2,916,964
DEVICE FOR FEEDING DISCS IN PROJECTORS, VIEWERS, AND THE LIKE
Filed March 31, 1958  3 Sheets-Sheet 3
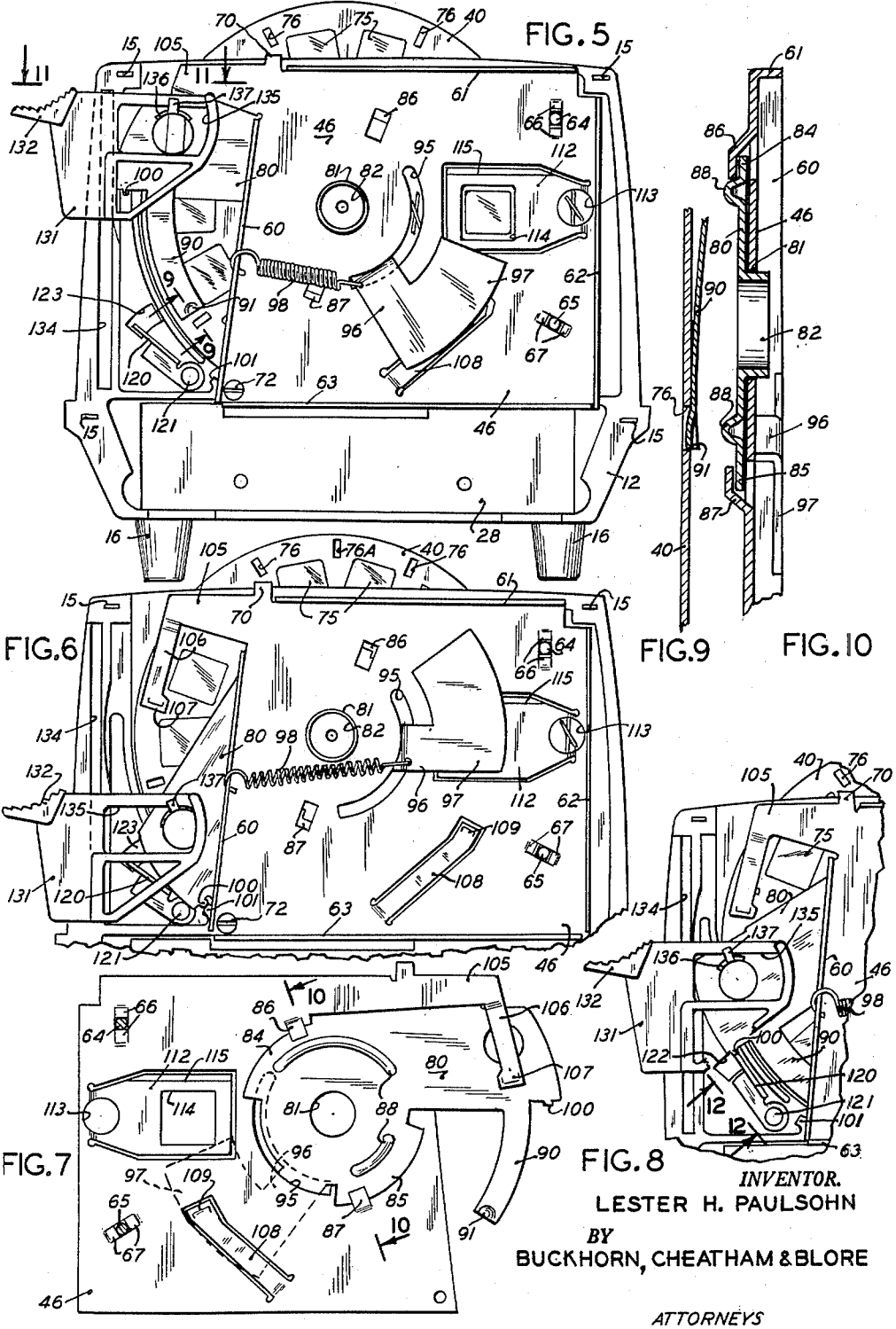
INVENTOR.
LESTER H. PAULSOHN
BY
BUCKHORN, CHEATHAM & BLORE
ATTORNEYS

United States Patent Office

2,916,964
Patented Dec. 15, 1959

2,916,964

DEVICE FOR FEEDING DISCS IN PROJECTORS, VIEWERS, AND THE LIKE

Lester H. Paulsohn, Portland, Oreg., assignor to Sawyer's Inc., Progress, Oreg., a corporation of Oregon Application March 31, 1958, Serial No. 725,011

5 Claims. (Cl. 88—27)

The present invention comprises an improvement in means for feeding a disc having a concentric series of transparencies mounted therein rotatively in step-by-step fashion for positioning the transparencies in alignment with a viewing aperture or projecting means. The invention is of particular utility in a small, light-weight projector for two-dimensional projection of single transparencies, and in this respect comprises an improvement upon the projector disclosed and claimed in the patent to Smith, 2,625,078, January 13, 1953. However, the invention may be incorporated in a three-dimensional projector such as disclosed and claimed in the patent to Smith, 2,764,911, October 2, 1956, and may also be incorporated in a stereoscopic viewer such as disclosed and claimed in the patent to Gruber, 2,511,334, June 13, 1950.

One object of the present invention is to provide means for advancing the disc comprising a linearly guided, manually actuated member. This aspect of the invention is of most importance in connection with a light-weight, two-dimensional projector, since lineal actuation of the feeding means eliminates a tendency to displace the projector laterally during feeding movements such as occasioned by the arcuately movable, manually engageable feeding lever of the above-identified Smith patents.

A further object of the present invention is to provide means whereby step-by-step rotation of a transparency mounting disc having a plurality of evenly spaced transparencies arranged circumferentially therein may be achieved in one of two manners, either to position each succeeding transparency at each feeding movement, or to position every alternate transparency at each feeding movement. The discs utilized in a stereoscopic viewer, or projector, as disclosed in the above patents, ordinarily contain seven stereopairs of transparencies so arranged that alternating views are relatively upside down, thereby demanding that each feeding movement should advance the disc by the spacing of two transparencies to bring the transparencies into upright position for viewing or projecting. However, the same disc may be utilized to mount single transparencies for two-dimensional viewing or projecting. This is of particular value to salesmen, demonstrators, or lecturers who wish to mount a greater number of scenes on a single disc. In such discs successive views would be oriented in the same direction and the disc would be advanced the spacing of successive transparencies at each feeding movement. The present invention comprises means whereby either type of disc may be utilized by properly positioning a device for limiting feeding movement of the disc. Details of a disc mounting seven stereopairs of transparencies may be ascertained from the patent to Paulsohn, 2,783,563, March 5, 1957. The same disc may be utilized for mounting fourteen, single, two-dimensional views, with or without slight modification as will presently appear.

The objects and advantages of the present invention will be more readily ascertained from inspection of the accompanying drawings taken in connection with the following specification, wherein like numerals refer to like parts throughout and in which a preferred embodiment of the invention is illustrated and described.

In the drawings:

Fig. 3 is a vertical section through the projector taken substantially along line 3—3 of Fig. 2;

Fig. 4 is a vertical section through the projector taken substantially along line 4—4 of Fig. 3;

Fig. 5 is a vertical section through the projector taken substantially along line 5—5 of Fig. 3, illustrating a form of transparency mounting disc therein, with the apparatus set to advance alternate transparencies to projecting position, and showing the normal position of the feeding mechanism;

Fig. 6 is a view similar to Fig. 5 showing a modified form of the disc mounted therein and showing the feeding mechanism at the end of a feeding movement to advance alternate transparencies to the projecting position;

Fig. 7 is a separated view of a mounting plate and related mechanism, showing the opposite side thereof from that illustrated in Figs. 5 and 6;

Fig. 8 is a partial view corresponding to Fig. 6 and illustrating the mechanism at the end of a feeding movement to advance succeeding transparencies to projecting position;

Fig. 9 is a partial section on a greatly enlarged scale taken substantially along line 9—9 of Fig. 5;

Fig. 10 is a vertical section on an enlarged scale taken substantially along line 10—10 of Fig. 7;

Fig. 11 is a horizontal section taken substantially along line 11—11 of Fig. 5;

Fig. 12 is a section on an enlarged scale taken substantially along line 12—12 of Fig. 8; and Fig. 13 is a view of a separable fastener used to unite major frame parts together.

Figures 1, 2:
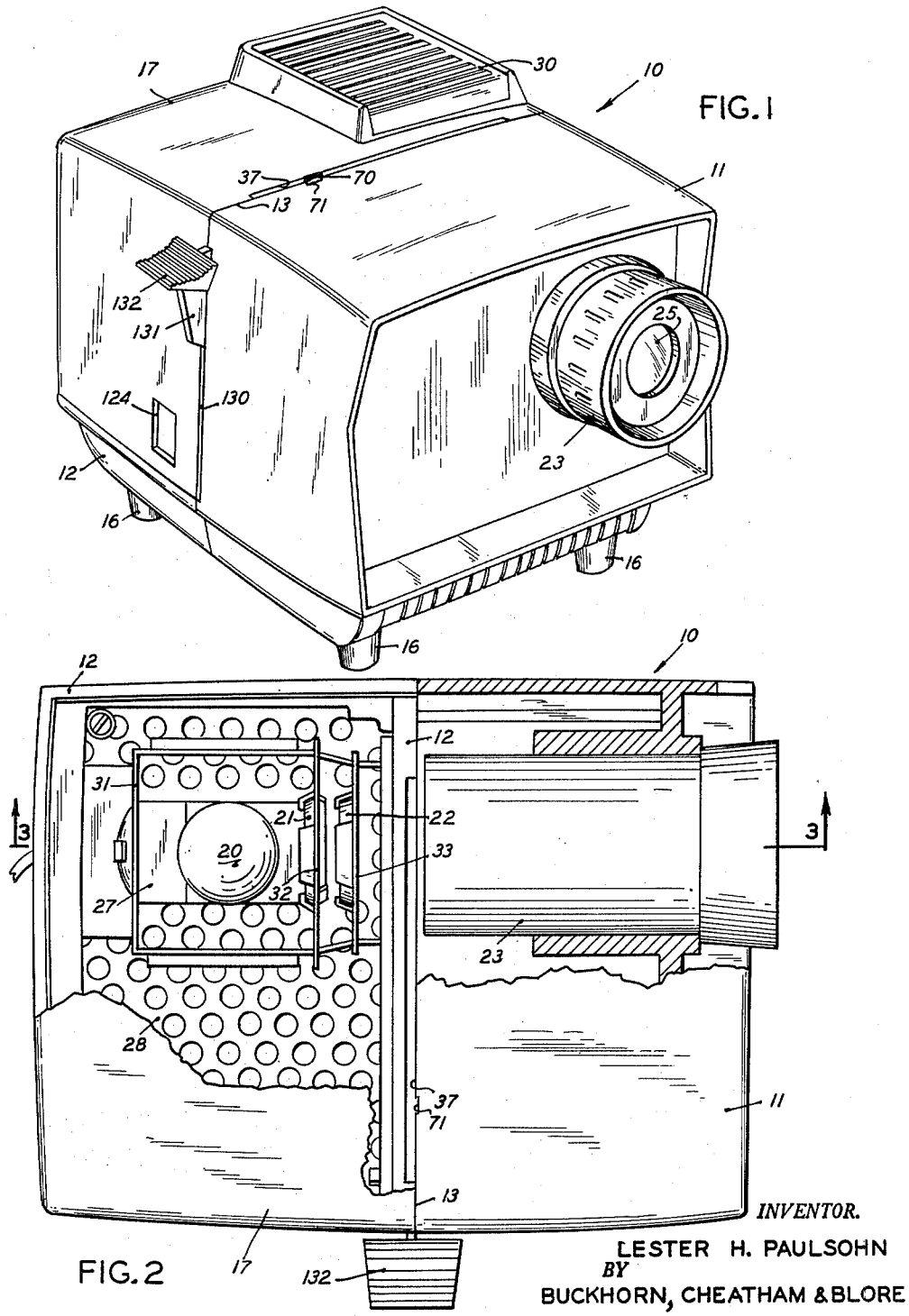
Fig. 1 is a view in perspective of a projector embodying the present invention.
Fig. 2 is a plan view of the projector with parts broken away.

The two-dimensional projector herein illustrated comprises a frame 10 preferably formed of two parts, a forward part 11 and a rearward part 12, each molded of a suitable plastic. The parts meet along line 13, being held together by suitable separable fastening means such as the pronged metal strips 14 which are inserted in slots 15 in the frame parts. The two parts are assembled by pressing them firmly together and the prongs on the fasteners will thus hold them, and separation may be accomplished by inserting a knife between the two parts and prying them apart. The frame is preferably provided with feet 16 for resting on a supporting surface, and means (not shown) may be provided for elevating the front end of the frame for adjusting the line of projection. A rear cover portion 17 is removably secured to part 12 by suitable means (not shown).

Projecting means are mounted in the frame, the same comprising a lamp 20, lenses 21 and 22, and an adjustable focusing tube 23 mounting lenses 24 and 25. The lamp 20 is mounted in a suitable socket 26 supported in a mounting block 27 affixed in the rear frame portion 12. A perforated plate 28 is fixed to the bottom of frame part 12 and a louvered plate 30 is fixed in an opening in the cover portion 17 whereby air to cool the lamp and lenses may circulate through the rear portion of the projector. A louvered, sheet metal shield 31 is mounted on block 27 to induce greater circulation around the lamp 20. Preferably the lenses 21 and 22 are respectively mounted in vertically slidable plates 32 and 33 which are slidably mounted in slots in the shield 31.

The optical axes of the lenses 21 and 22 are aligned with an aperture 34 in a vertical partition 35 forming the front of frame part 12, the major portion of the forward surface thereof being slightly behind the parting line 13. The forward edge of the cover portion 17 is recessed to define a slide inserting slot 37 having a width and depth to permit insertion and removal of a transparency mounting disc 40. The forward surface of the partition 35 is provided with a series of ribs 41, 42, 43 and 44 which project forwardly and engage the rear surface of a metal plate 46, which rear surface is forwardly of the parting line 13. The ribs and plate thereby define a pocket, having a semicircular bottom, and in which the disc 40 is rotatably seated with a portion thereof projecting above the top of the projector so that it may be grasped for removal. A plurality or ribs 47, 48, 49 and 50 extend outwardly from partition 35 to a lesser depth than the pocket rim defining ribs 41, 42, 43 and 44 so as to lessen frictional engagement of the disc with the partition 35, and a raised area 51 of the same height surrounds the aperture 34. The partition 35 is provided with a pair of depressions 52 on opposite sides of the aperture 34 in which are provided slots 53, tabs 54 on the shield 31 extending through the slots and being twisted to maintain the shield in position. The tabs end beneath the plane of the raised area 51 and associated ribs so that they will not engage and scratch the disc and transparencies.

The plate 46 comprises a sheet of spring metal, with portions thereof serving to mount disc feeding mechanism and other portions thereof serving as means resiliently to locate the transparencies in proper projecting position. The greater portion of the edges of the plate are provided with forwardly turned flanges indicated at 60, 61, 62 and 63 to stiffen the plate. An integral plastic post 64 on rib 44 and a similar post 65 on rib 43 project forwardly and are engaged and gripped by opposed pairs of tongues 66 and 67, respectively, formed by appropriately slitting the plate 46, thus partially locating and maintaining the plate in position. A tab 70 on the upper edge of the plate projects into a notch 71 in the rear edge of the forward frame portion 11 for the same purpose, and a screw 72 passes through a lower corner of the plate to hold it in mounted position. Suitable projections and ledges (not shown) on the forward frame portion 11 firmly maintain the plate 46 in position.

The discs 40 mount a concentric series of evenly spaced transparencies 75, and usually are provided with a concentric series of feeding apertures 76 between every other pair of transparencies, particularly when the disc mounts stereo-pairs of transparencies as in Fig. 5. An alternative form of disc is illustrated in Fig. 6 wherein a feeding aperture 76A is provided betwen each pair of transparencies, thus assuring accurate positioning of successive views, as will presently appear.

A feeding lever 80 is pivotally mounted for limited rotational movement on plate 46. For this purpose plate 46 is provided with a circular opening 81 coaxially located with respect to the disc mounting pocket and the disc therein, and a cylindrical flange 82 on feeding lever 80 projects forwardly through the opening 81. The lever 80 is provided with an opposed pair of arcuate portions 84 and 85, respectively, which are concentric to the cylindrical flange 82 and which are retained beneath a pair of tabs 86 and 87, respectively, struck from plate 46. Since the lever is on the inside of the pocket, it is provided with a raised pair of arcuate ribs 88 which engage the surface of the inserted disc to prevent it from being scratched by the lever and the tabs 86 and 87.

Near the outer end of the lever there is provided a downwardly projecting, arcuate finger 90 terminating in a feding claw 91 having a rounded disc engaging surface which is capable of entering a feeding aperture 76 in the disc. The claw 91 is positioned in the arcuate path of movement of the series of feeding apertures, and the lever 80 is made of resilient material with the arm being biased toward the disc. Normally, the feeding claw engages the arcuate rib 50, and it is sprung aside when the disc is inserted. When the feeding lever rests in normal position as illustrated in Fig. 5, the feeding claw is withdrawn from the closest adjacent aperture 76 so that withdrawal of the disc from the pocket is permitted. The normal feeding stroke of the claw is slightly longer than the distance between a pair of feeding apertures 76. When the feeding claw first moves it soon enters the adjacent feeding aperture 76 and then rotates the disc the proper distance to bring a transparency into alignment with the aperture 34.

The plate 46 is provided with an arcuate slot 95 concentric to the opening 81. An arm 96 on feeding lever 80 mounts a shutter 97 which is normally positioned beneath the aperture 34, as illustrated in Fig. 5. The shutter is of such arcuate extent that it shuts off the rays from the lamp prior to commencement of movement of the disc and will obscure the aperture during shifting movement of the disc so as to avoid straining the observer's eyes. A spring 98 is tensioned betwen arm 96 and flange 60 to return the feeding lever to its normal position after manual actuation thereof. The spring 98 holds the lever in its normal position by reason of the arm 96 engaging the end of slot 95. Manual actuation of the lever is limited by reason of a lug 100 at the end of the lever engaging an abutment 101 on the frame part 12 adjacent the lower end of rib 41.

The upper edge of plate 46 is provided with a lateral extension 105 from which depends a finger 106 terminating in a rounded detent 107 capable of snugly engaging in one of the feeding apertures 76. The finger 106 is biased across the pocket and the detent 107 normally engages the rib 50, but, being rounded, it may readily slip into and out of the apertures 76 to permit rotation of the disc and insertion and withdrawal thereof.

Nearly diametrically opposite the finger 106 the plate 46 is slotted to provide a second finger 108 which terminates in a similar detent 109. The finger 108 is similarly biased and the detent 109 normally engages the rib 50, and is capable of slipping into and out of the aperture 76 as previously described. The detents 107 and 109 are so positioned as to simultaneously engage a pair of the apertures 76 to hold the disc in position in spite of the slight frictional engagement of the feeding claw on its return movement.

The plate 46 is slit opposite flange 62 to provide a rectangular tongue 112 extending across the path of movement of the transparencies 75. An aperture 113 in the attached end of the tab is provided to reduce the force required to depress the tab, which is normally biased forwardly so as to engage the flat surface 51 on the partition 35. The tongue 112 is provided with a rectangular aperture 114 in which the transparencies 75 are framed when properly positioned. The upper edge of the tongue 112 is reversely bent, as indicated at 115, so as to permit ready insertion of a disc. The tongue 112 presses the disc against the area 51 of partition 35 so as properly to maintain the transparency in correct position with respect to the projecting mechanism.

When a disc having single transparencies for two-dimensional viewing is provided, it is preferred that the number of feeding apertures 76 be doubled, this being indicated by the additional feeding apertures 76A in Fig. 6, there being one feeding aperture for each transparency. In order to position successive views, instead of alternate views, in projecting position, means are provided to limit the feeding movement as follows: A limiting abutment 120 is pivotally mounted on the partition 35 as by means of a pivot 121. The abutment is normally positioned out of the path of movement of the lug 100 on the feeding lever 80. A tab 122 on the abutment projects rearwardly through a slot 123 in partition 35 and may be engaged to shift the abutment into the path of movement of the lug 100, thereby reducing the feeding movement of the lever. The casing part 17 may be removed to accomplish this shifting movement, or a finger opening 124 may be provided in the side wall of part 17 for that purpose, which opening may also serve to illuminate lecturer's notes, or disc titles. The limiting position of the abutment is illustrated in Fig. 8.

In the aforesaid Smith Patent 2,625,078 the part corresponding to feeding lever 80 projects laterally through the side of the casing and is provided with a manually engageable knob by means of which feeding movement is accomplished. This knob moves through an arcuate path, thereby tending to cause the operator to shift the projector laterally during each feeding movement. In the present invention means are provided for accomplishing feeding movement by linear, manual actuation which is translated into rotating movement of the feeding lever as follows: A rear side edge of casing part 11 is recessed to provide a vertical slot 130 along the parting line 13. A molded plastic slide 131 projects through the slot and is provided with a ribbed finger tab 132. A vertical rib 133 on the slide projects into a vertical groove 134 in the casing part 12. Lever 80 is provided with an arcuate tab 136 which engages the upper edge of a slot 135 in the slide, said edge being horizontal. A finger 137 on the outer edge of the arcuate tab 136 is bent upwardly so as more firmly to engage the lever with the slide. The device comprises a pin and slot connection for translating vertical movement of the slide to arcuate movement of the feeding lever. The spring 98 maintains the arcuate tab 136 against the horizontal upper edge of the slot 135.

The adjacent surfaces of the frame parts 11 and 17 defining the slot 130, and the groove 134, comprise means in the frame defining a vertical, linear track adjacent the arcuate path of movement of the feeding lever, extending parallel to the plane of a disc mounted in the pocket and parallel to a tangent to the disc. The pin and slot connection between the feeding lever and the slide translates vertical, linear movement of the slide to rotative movement of the feeding lever. The pressure exerted against the mechanism is in a generally downward direction so that lateral shifting movement of the projector is substantially eliminated.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A device wherein a transparency-carrying disc having perforations for cooperation with feeding means and having evenly spaced, circumferentially arranged transparencies mounted therein may be placed, comprising a frame, means defining a pocket in said frame to receive the disc, a feeding lever pivotally mounted in said frame for partial rotation about an axis coincident with the center of the disc and having means thereon for successively engaging the perforations in said disc to bring the transparencies mounted in said disc to a desired position, means on said frame defining a linear track extending vertically, parallel to the plane of a disc mounted in the pocket and parallel to a tangent to the disc, a slide comprising a portion engaged in said track whereby said slide is guided for linear sliding movement from end to end of said track, said slide also comprising a manually engageable portion projecting from said frame whereby said slide may be depressed to the lower end of said track, spring means for returning the slide to the upper end of said track when depressed by manual actuation and released, and a pin and slot connection between said lever and said slide for translating linear movement of said slide into rotary movement of said lever to thereby rotate said disc.

2. A projector comprising a frame, means in said frame defining an upwardly open pocket in which may be placed a circular disc having a concentric evenly-spaced series of feeding apertures therein and a concentric evenly-spaced series of transparencies mounted therein, a lever pivotally mounted in said frame for partial rotation about an axis coincident with the center of a disc in said pocket, projecting means in said frame for projecting images of the transparencies, a feeding claw on said lever for engaging the feeding perforations in said disc to position different transparencies in projecting relation to said projecting means, means in said frame defining a vertical, linear track adjacent the arcuate path of movement of said lever, a slide comprising a portion engaged in said track whereby said slide is guided for linear, sliding movement from end to end of said track, said slide also comprising a manually engageable portion projecting from said frame whereby said slide may be manually depressed to the lower end of said track, a pin and slot connection between said slide and said lever whereby linear movement of said slide is translated into rotative movement of said lever to thereby rotate said disc, and spring means resisting manual depression of said slide for returning said slide to the upper end of said track and said lever to its original position.

3. A projector comprising a frame, means in said frame defining an upwardly open pocket in which may be placed a circular disc having a concentric evenly-spaced series of feeding apertures therein and a concentric evenly-spaced series of transparencies mounted therein, a lever pivotally mounted in said frame for partial rotation about an axis coincident with the center of a disc in said pocket, projecting means in said frame for projecting images of the transparencies, a feeding claw on said lever for engaging the feeding perforations in said disc to position different transparencies in projecting relation to said projecting means, means in said frame defining a vertical, linear track adjacent the arcuate path of movement of said lever, a slide comprising a portion engaged in said track whereby said slide is guided for linear sliding movement from end to end of said track, said slide also comprising a manually engageable portion projecting laterally from said frame whereby said slide may be manually depressed to the lower end of said track, a pin and slot connection between said slide and said lever whereby linear movement of said slide is translated into rotative movement of said lever to thereby rotate said disc, spring means resisting manual depression of said slide for returning said slide and said lever to its original position, and a limiting abutment pivotally mounted in said frame and selectively engageable with said lever for limiting the feeding movement thereof.

4. A device wherein a transparency-carrying disc having evenly spaced, circumferentially arranged transparencies mounted therein may be placed, comprising a frame, means defining a pocket in said frame to receive the disc, and feeding means for partially rotating said disc for successively bringing transparencies therein to a desired position comprising a pivotally mounted feeding lever for partially rotating said disc, a vertically movable slide mounted in said frame, a pin and slot connection between said feeding lever and said slide for converting linear movement of said slide to arcuate movement of said feeding lever, and spring means for returning said lever and slide.

5. A device wherein a transpacency-carrying disc having evenly spaced, circumferentially arranged transparencies mounted therein may be placed, comprising a frame, means defining a pocket in said frame to receive the disc, and feeding means for partially rotating said disc for successively bringing transparencies therein to a desired position comprising a pivotally mounted feeding lever for partially rotating said disc, a vertically movable slide mounted in said frame, a pin and slot connection between said feeding lever and said slide for converting linear movement of said slide to arcuate movement of said feeding lever, spring means for returning said lever and slide, and a limiting abutment pivotally mounted in said frame and selectively movable to and from a position at which it engages a part of said feeding means to limit the movement thereof.

References Cited in the file of this patent

UNITED STATES PATENTS

| | | |
|---|---|---|
| 979,117 | Whiting | Dec. 20, 1910 |
| 1,492,162 | Delens | Apr. 29, 1924 |
| 2,625,078 | Smith | Jan. 13, 1953 |